(12) United States Patent
Muramatsu

(10) Patent No.: US 10,104,351 B2
(45) Date of Patent: Oct. 16, 2018

(54) PROJECTION SYSTEM AND CALIBRATION APPARATUS

(71) Applicant: Panasonic Intellectual Property Management Co., Ltd., Osaka (JP)

(72) Inventor: Fumio Muramatsu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 15/452,953

(22) Filed: Mar. 8, 2017

(65) Prior Publication Data

US 2017/0264873 A1  Sep. 14, 2017

(30) Foreign Application Priority Data

Mar. 10, 2016 (JP) .................................. 2016-047628
Feb. 24, 2017 (JP) .................................. 2017-033071

(51) Int. Cl.
*H04N 9/31* (2006.01)
*H04N 5/232* (2006.01)

(52) U.S. Cl.
CPC ....... *H04N 9/3185* (2013.01); *H04N 5/23238* (2013.01); *H04N 9/3194* (2013.01)

(58) Field of Classification Search
CPC .............. H04N 9/3185; H04N 9/3194; H04N 5/23238; H04N 5/74; H04N 9/317; H04N 9/3182; H04N 9/3105; H04N 9/3179; H04N 9/3176; H04N 9/31; H04N 5/232

USPC .................. 348/135, 36, 744–747, 806, 807; 702/127, 85; 353/30, 33, 37, 50, 98
See application file for complete search history.

(56) References Cited

U.S. PATENT DOCUMENTS

| | | | |
|---|---|---|---|
| 6,652,104 B2 | 11/2003 | Nishida et al. | |
| 6,846,081 B2 | 1/2005 | Mochizuki et al. | |
| 7,290,887 B2 | 11/2007 | Tamura et al. | |
| 2016/0134851 A1* | 5/2016 | Grundhofer | G01B 11/2504 348/745 |

FOREIGN PATENT DOCUMENTS

| | | |
|---|---|---|
| JP | 2002-262198 | 9/2002 |
| JP | 2004-260785 | 9/2004 |
| JP | 2005-64667 | 3/2005 |

* cited by examiner

*Primary Examiner* — Sherrie Hsia
(74) *Attorney, Agent, or Firm* — Wenderoth, Lind & Ponack, L.L.P.

(57) ABSTRACT

A projection system includes a projection unit, an optical path change unit, a capture unit, and a controller. The projection unit emits projection light for displaying an image. The optical path change unit changes an optical path for the projection light and guides the projection light toward a prescribed projection surface. The capture unit captures a projection image that is projected onto the projection surface from the optical path change unit, based on the image. The controller calculates a first distance that is a length from the projection unit to the optical path change unit along the optical path and a second distance that is a length from the projection unit to the projection surface along a vertical direction, based on the captured image by the capture unit, and controls the projection image based on the first distance and the second distance that are calculated.

9 Claims, 15 Drawing Sheets

$L/H=(\tan\theta+\cot(2\alpha))$

PROJECTION SYSTEM AND CALIBRATION APPARATUS

BACKGROUND

1. Technical Field

The present disclosure relates to a projection system that projects an image, and a calibration apparatus that performs initial adjustment of the projection system.

2. Description of the Related Art

Japanese Patent Unexamined Publication No. 2002-262198 discloses a projector that enlarges an image which is to be displayed on a liquid crystal panel and the like, using a projection lens and projects the enlarged image onto a screen through an angle-variable mirror. The projector in Japanese Patent Unexamined Publication No. 2002-262198 includes an angle sensor that detects an angle between a center axis of image light that results from a mirror and a normal to the screen, and a distance sensor, such as an ultrasonic sensor that detects a distance between the projector and the screen. In the projector in Japanese Patent Unexamined Publication No. 2002-262198, distortion of an image that is displayed on a projection surface is adjusted based on a result of the detection by the angle sensor and the distance sensor.

SUMMARY

In this type of projector, the distance between the projector and the mirror is already known, and the sensor that detects the distance between the projector and the screen is mounted. Because of this, it is easy to adjust, that is, calibrate a position of a projection image from the projector. The present disclosure provides a projection system and a calibration apparatus that is capable of easily performing calibration in a projection system in which a projector and a mirror are configured to be separate bodies and a distance between them is not already known.

A projection system according to an aspect of the present disclosure includes a projection unit, an optical path change unit, a capture unit, and a controller. The projection unit emits projection light for displaying a prescribed image. The optical path change unit changes an optical path for the projection light from the projection unit and guides the projection light toward a prescribed projection surface. The capture unit captures a projection image that is projected onto the projection surface from the optical path change unit, based on the prescribed image. The controller controls the projection image. The controller calculates a first distance that is a length from the projection unit to the optical path change unit along the optical path and a second distance that is a length from the projection unit to the projection surface along a vertical direction, based on the captured image by the capture unit, and controls the projection image based on the first distance and the second distance that are calculated.

A calibration apparatus according to another aspect of the present disclosure performs calibration of the projection system that projects the projection image.

With a projection system and a calibration apparatus in the present disclosure, calibration in a projection system that projects a projection image can be easy to perform.

DETAILED DESCRIPTION

Figure 1:
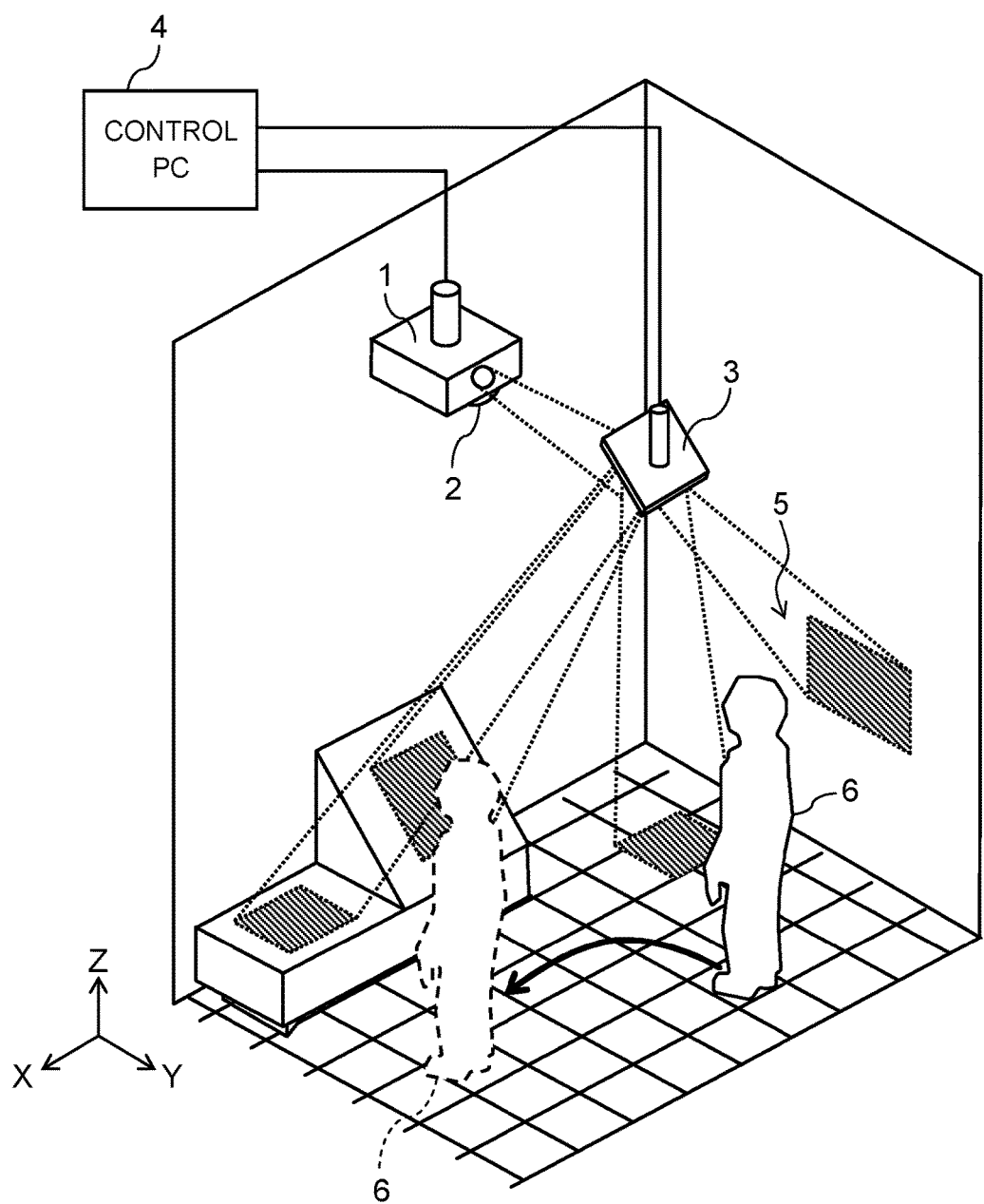
FIG. 1 is a diagram for describing an outline of a projection system according to a first embodiment of the present disclosure.

Embodiments will be described in detail below, suitably referring to the drawings. However, in some cases, a description that is more detailed than is necessary is omitted. For example, in some cases, a detailed description of a matter is already known, or a repeated description of substantially the same configuration is omitted. This serves to prevent the following description from being unnecessarily redundant and to provide an easy understanding to a person of ordinary skill in the related art.

The applicant provides the accompanying drawing and the following description in order for a person of ordinary skill in the related art to get a sufficient understanding of the present disclosure, and does not intend this to limit subject matters that are set forth in claims.

First Embodiment

1. Configuration

1-1. Outline

An outline of a projection system according to a first embodiment is described referring to FIG. 1. FIG. 1 is a diagram for describing an outline of the projection system according to the present embodiment.

The projection system according to the present embodiment, as illustrated in FIG. 1, includes projector 1, omnidirectional camera 2, mirror unit 3, and control PC (a personal computer) 4. The projection system according to the present embodiment is a system in which projection light, which is emitted from projector 1 that hangs from a ceiling or the like, is reflected from mirror unit 3, and thus projection image 5 that is based on the projection light is projected onto arbitrary projection surfaces, such as a floor, a wall surface, and a desk surface.

In the present system, omnidirectional camera 2 is installed on the bottom of projector 1. The control PC 4 controls projection image 5 on the projection surface based on an image that is captured by omnidirectional camera 2 gets a view of the floor and the wall surface. For example, control PC 4 detects person 6 on the floor based on the captured image, and, while following person 6, projects projection image 5 including various pieces of presentation information and performance contents.

At this point, in a case where projector 1 and mirror unit 3 are configured to be combined into one piece, this requires an apparatus that has the total weight of projector 1 and mirror unit 3 to hang from the ceiling, but the apparatus cannot be easily installed in such a manner. Furthermore, because a specific type of projector and a mirror unit are installed in an integrated manner, a mirror unit is not easily deployed to fit with various types of projectors. Thus, in the projection system according to the present embodiment, projector 1 and mirror unit 3 are configured to be separate bodies. Accordingly, projector 1 and mirror unit 3 can be installed one at a time, and a mirror unit can be deployed to fit with various types of projectors, thereby making the present system easy to introduce and handle.

As illustrated in FIG. 1, a vertical direction in which projector 1 hangs from the ceiling is hereinafter defined as a Z direction, and a horizontal plane that intersects the Z direction is hereinafter defined as an XY plane. Furthermore, a projection direction in which the projection light is emitted from projector 1 is defined as a Y direction, and a width direction of projector 1 that intersects the Y and Z directions is defined as an X direction.

1-2. System Configuration

Figure 2:
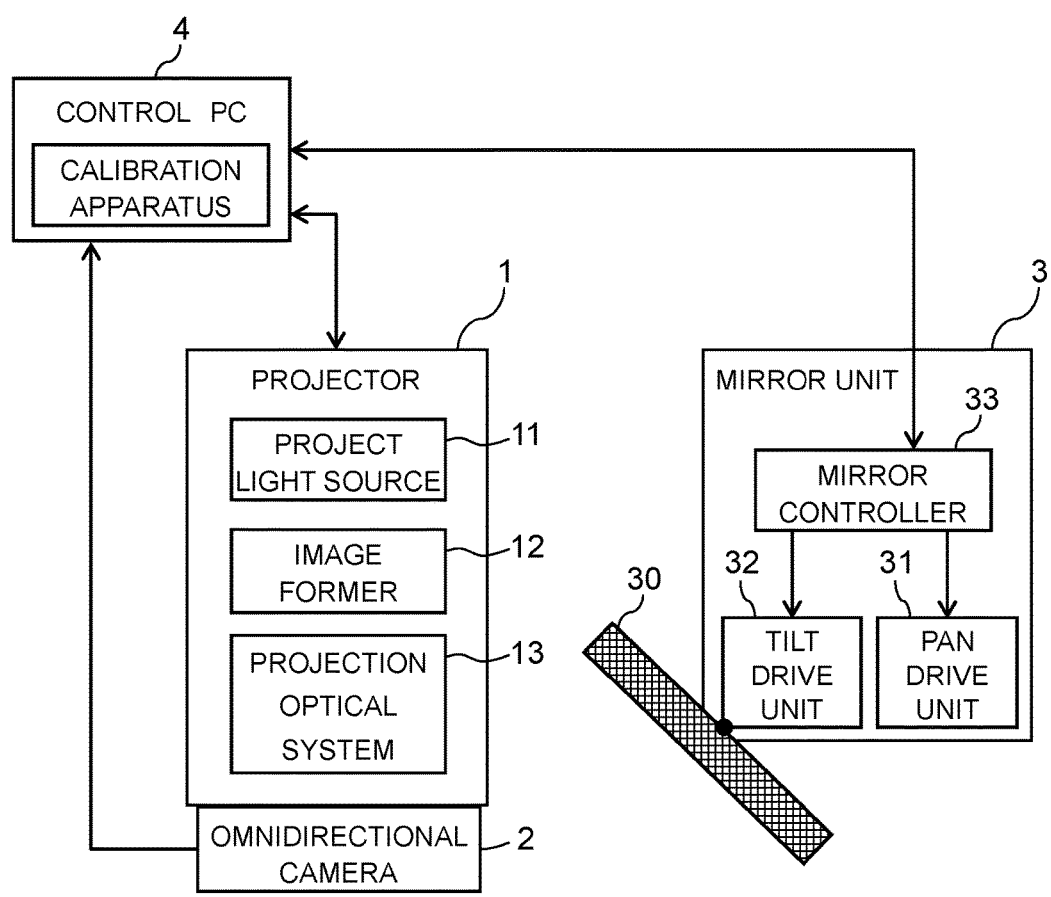
FIG. 2 is a block diagram illustrating a configuration of the projection system according to the first embodiment.

A configuration of the projection system according to the present embodiment is described referring to FIGS. 1 and 2.

FIG. 2 is a block diagram illustrating the configuration of the present system.

As illustrated in FIG. 2, in the present system, projector 1, omnidirectional camera 2, and mirror unit 3 each are connected to control PC 4. Control PC 4 is one example of a controller in the present system. A configuration of each unit of the present system is described.

1-2-1. Configuration of the Projector

Projector 1, as illustrated in FIG. 2, includes projection light source 11, image former 12, and projection optical system 13. Projector 1, for example, is a projector that is a type of digital light processing (DLP), 3 liquid crystal display (LCD), or liquid crystal on silicon (LCOS) method, or the like. Projector 1 emits the projection light that generates projection image 5 that is based on a video signal which is input from control PC 4. Projector 1 is one example of a projection unit in the present system.

Projection light source 11, for example, is configured with a laser diode (LD), a light emitting diode (LED), or a halogen lamp. Projection light source 11 irradiates image former 12 with visible light. Projection light source 11 may have light source elements for one or more colors such as RGB, or a light source element of white, in a suitable manner according to a method in which projector 1 performs projection, and may have only a light source element for a single color.

Image former 12 includes a spatial light modulation element, such as a digital micromirror device (DMD) or an LCD. Image former 12 forms an image that is based on the video signal from control PC 4, on an image formation surface of the spatial light modulation element. Light from projection light source 11 is modulated spatially according to the image that is formed on image former 12, thereby generating the projection light.

Projection optical system 13 includes a zoom lens that sets a viewing angle of projector 1, and a focus lens that adjusts a focus. Drive mechanisms, such as a motor for driving various lenses, are built into projection optical system 13.

Projector 1, for example, may have a projection controller (for example, a microcomputer or a central processing unit (CPU)) that realizes a specific function of projector 1, such as keystone correction, digital zoom and optical zoom. Furthermore, each function described above may be realized in control PC 4.

Furthermore, projector 1 may be of a laser scanning type, and may be configured to include a micro electro mechanical systems (MEMS) mirror that is able to be driven in a scanning direction, or a galvanometer mirror. In the present system, because projector 1 and mirror unit 3 are separate bodies, projector 1 is not limited to a dedicated apparatus that finds application in the projection of the projection image through mirror unit 3, and thus a general-purpose projector can be used.

1-2-2. Configuration of the Omnidirectional Camera

Omnidirectional camera 2 includes an imaging element, such as a charge coupled device (CCD) image sensor or a complementary metal oxide semiconductor (CMOS) image sensor, and an omnidirectional lens (a fish-eye lens) with a viewing angle 180°. Omnidirectional camera 2 captures an image in all directions from a position where omnidirectional camera 2 is installed, generates, for example, the captured image that constitutes an omnidirectional-fashion image, and transmits the captured image to control PC 4. Furthermore, omnidirectional camera 2, for example, may lay out the omnidirectional-fashion images and may generate a panoramic image. Omnidirectional camera 2 may perform an imaging operation with a prescribed periodicity, and may perform the imaging operation under the control of control PC 4. Omnidirectional camera 2 is one example of a capture unit in the present system.

1-2-3. Configuration of the Mirror Unit

Figure 3:
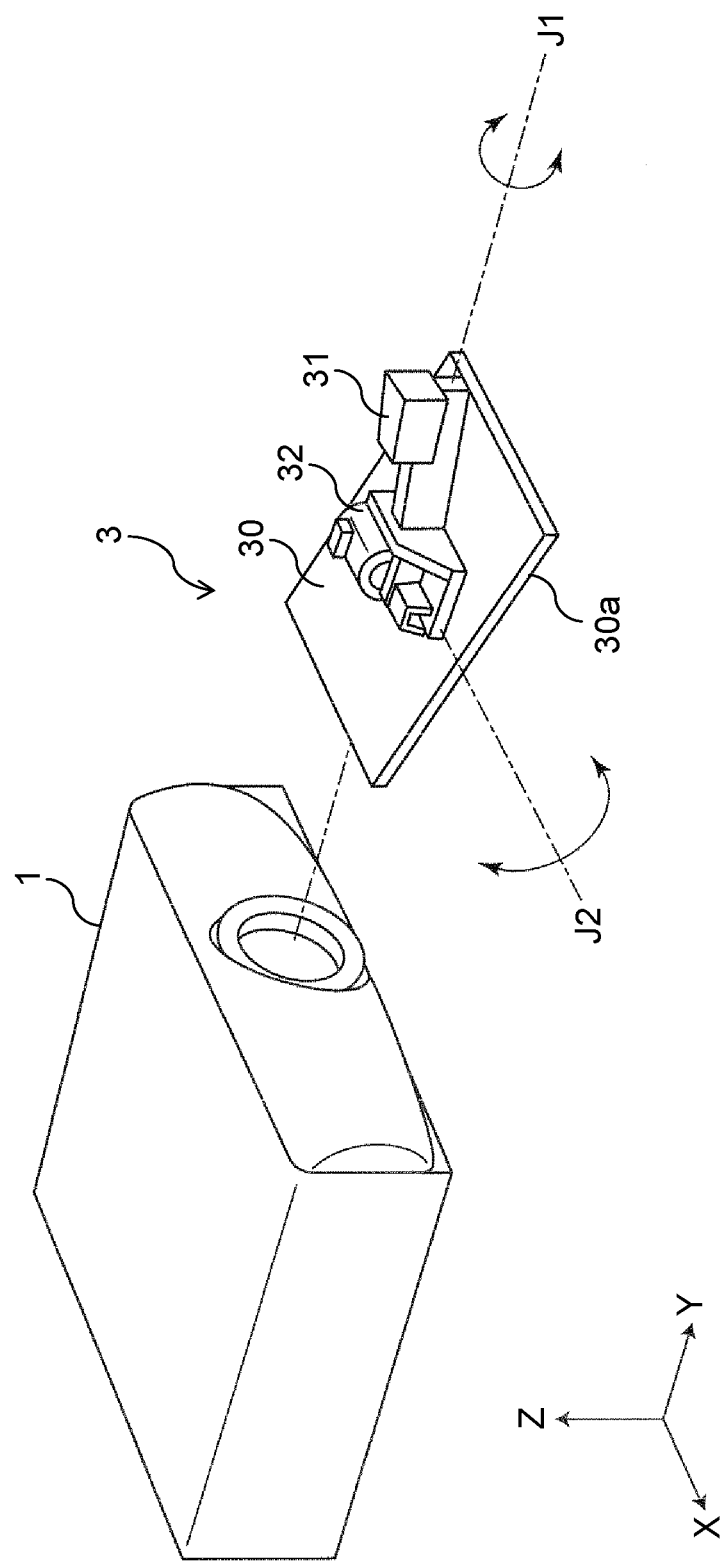
FIG. 3 is a perspective diagram illustrating an installed state of a mirror unit in the projection system according to the first embodiment.

A configuration of mirror unit 3 is described referring to FIGS. 2 and 3. FIG. 3 is a perspective diagram illustrating an installed state of mirror unit 3 in the present system.

Mirror unit 3 includes mirror 30, pan drive unit 31, tilt drive unit 32, and mirror controller 33. Mirror unit 3 is a device that drives mirror 30 in such a manner that mirror 30 rotates about two rotation axes. In the present system, mirror unit 3 is one example of an optical path change unit that changes an optical path for the projection light from projector 1 using mirror 30 and guides the projection light toward various projection surfaces.

Mirror 30, as illustrated in FIG. 3, has reflection surface 30a from which the projection light from the projector 1 is reflected. A shape of reflection surface 30a, for example, is a rectangular form that is defined by a horizontal size and a vertical size.

Pan drive unit 31 is configured to include a rotary encoder that measures an amount of displacement of a motor and of a rotation angle of the motor. Pan drive unit 31, as illustrated in FIG. 3, drives mirror 30 in such a manner that mirror 30 rotates about rotation axis J1 in parallel with an optical axis of projector 1. A rotation direction of rotation axis J1 is hereinafter referred to a "pan direction," and a rotation angle in the pan direction is hereinafter referred to "a pan angle."

Tilt drive unit 32 is configured to include a rotary encoder that measures an amount of displacement of a motor and of a rotation angle of the motor. Tilt drive unit 32, as illustrated in FIG. 3, drives mirror 30 in such a manner that mirror 30 rotates about rotation axis J2 in a direction that intersects the optical axis of projector 1 on reflection surface 30a of mirror 30. A rotation direction of rotation axis J2 is hereinafter referred to a "tilt direction," and a rotation angle in the tilt direction is hereinafter referred to "a tilt angle." Rotation axis J2 in the tilt direction rotates together with mirror 30 according to the rotation in the pan direction.

In mirror unit 3 according to the present embodiment, an angle of mirror 30 at which reflection surface 30a is a horizontal surface (the XY plane) is made when the pan angle and the tilt angle are set to 0° and 90°, respectively, and, based on those angles, the driving is performed in the pan direction and the tilt direction, thereby inclining reflection surface 30a at various inclination angles.

Referring back to FIG. 2, mirror controller 33, for example, is configured with a microcomputer and controls operation of mirror unit 3. For example, mirror controller 33 controls pan drive unit 31 and tilt drive unit 32, and thus changes the pan angle and the tilt angle. Furthermore, mirror controller 33 has an internal memory that is configured with a flash memory, and stores a size of reflection surface 30a and the like in the internal memory. Mirror controller 33 may be a hardware circuit, such as a dedicated electronic circuit that is designed to realize a prescribed function, or an electronic circuit that is reconfigurable, and may be configured with a CPU, a micro processing unit (MPU), or the like, which realizes a prescribed function in cooperation with software.

1-2-4. Constitution of the Control PC

Figure 4A:
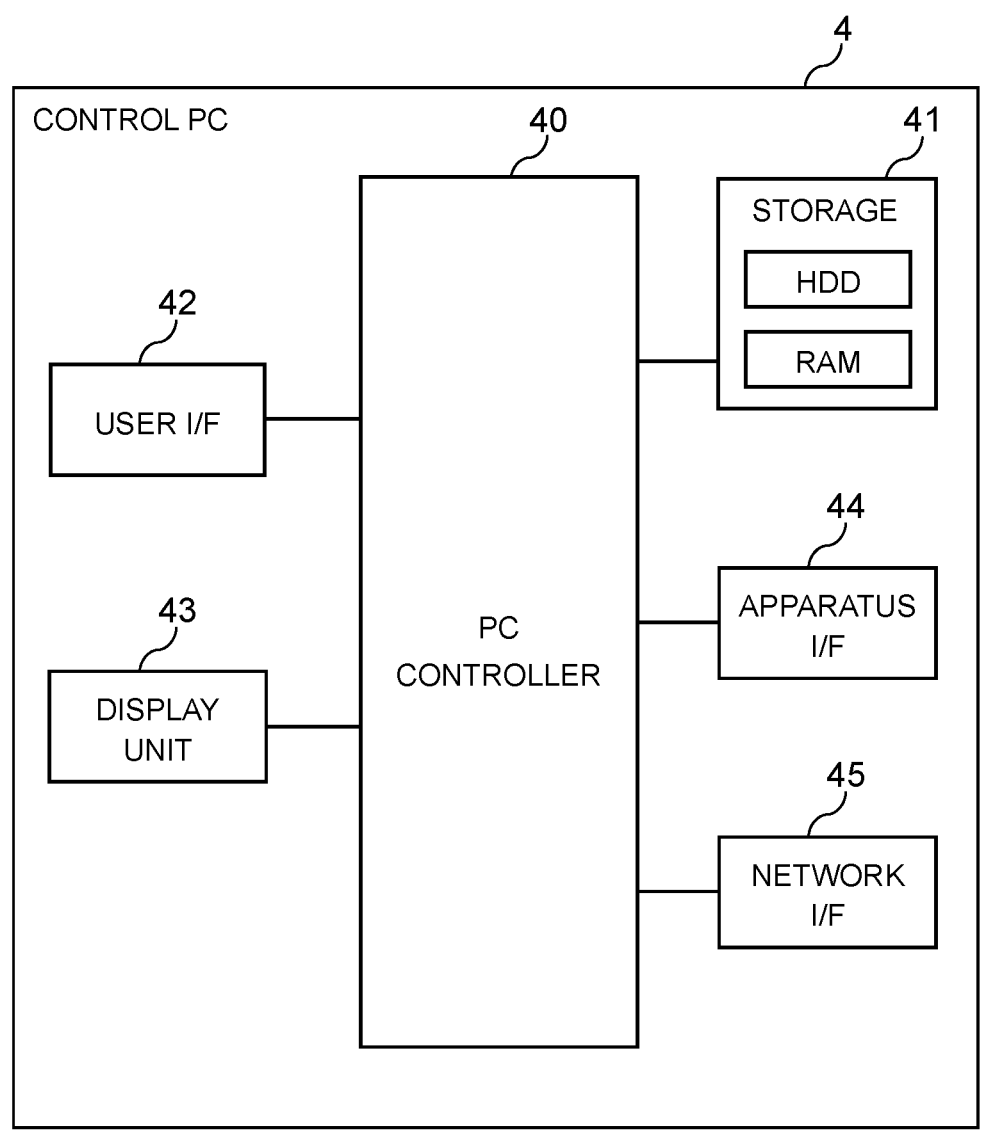
FIG. 4A is a block diagram illustrating a configuration of a control PC in the projection system according to the first embodiment.
Figure 4B:
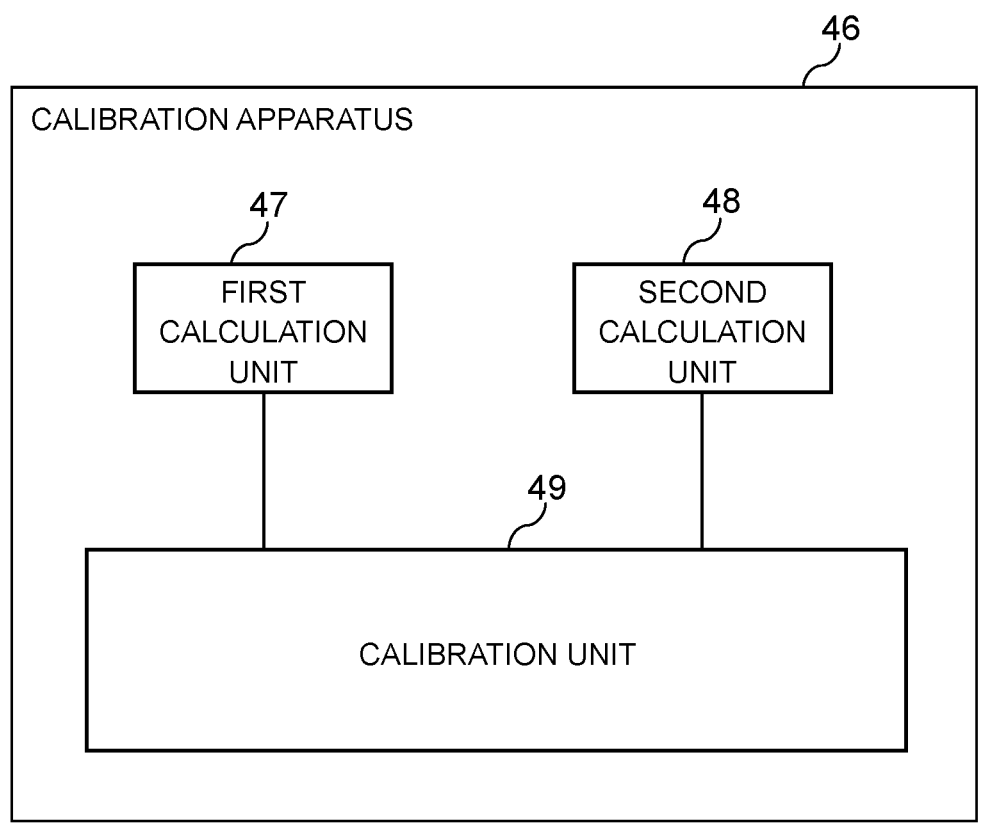
FIG. 4B is a block diagram illustrating a configuration of a calibration apparatus in the projection system according to the first embodiment.

A configuration of control PC 4 is described referring to FIGS. 2, 4A and 4B. FIG. 4A is a block diagram illustrating the configuration of control PC 4 in the present system. FIG. 4B is a block diagram illustrating the configuration of calibration apparatus 46 in the present system.

Control PC 4 is a personal computer that controls operation of each of the units (projector 1, omnidirectional camera 2, and mirror unit 3) that constitute the present system. Control PC 4 is one example of a control unit including calibration apparatus 46 that performs calibration of the present system.

As is illustrated in FIG. 4A, control PC 4 includes PC controller 40, storage 41, user interface 42, display unit 43, device interface 44, and network interface 45. An "interface" is hereinafter described as an "I/F" for short.

PC controller 40, for example, is configured with a CPU or an MPU, which realizes a prescribed function in cooperation with software, and controls overall operation of control PC 4. PC controller 40 reads data or a program that is stored in storage 41 and performs various types of arithmetic operation processing, thereby realizing various functions. For example, PC controller 40 performs a calibration operation by the projection system. A program for performing the calibration operation may be provided from a network, be provided from a prescribed storage medium, and be built into PC controller 40. Furthermore, PC controller 40 may be a hardware circuit, such as a dedicated electronic circuit that is designed to realize a prescribed function, or an electronic circuit that is reconfigurable. PC controller 40 is configured with various semiconductor integrated circuits, such as a CPU, an MPU, a microcomputer, a digital signal processor (DSP), a field programmable gateway (FPGA), and an application specific integrated circuit (ASIC).

Storage 41 is a storage medium that stores a program and data that are necessary for realizing a function of control PC 4, and, for example, includes a hard disk drive (HDD) or a semiconductor storage device (a solid state drive (SSD)). Furthermore, storage 41 may further include a semiconductor device, such as a dynamic random access memory (DRAM) or a static random access memory (SRAM), and temporarily stores data and also functions as a working area for PC controller 40. For example, storage 41 stores image data of the captured image by omnidirectional camera 2, pieces of image data of various projection images, and various parameters (for example, distance L and height H that will be described below) of the present system, and the like.

User I/F 42 includes an operation member on which a user performs an operation. User I/F 42, for example, includes a keyboard, a touchpad, a touch panel, a button, a switch, or a combination of these. User I/F 42 is one example of an acquisition unit that acquires various pieces of information that are input by the user.

Display unit 43, for example, is configured with a liquid crystal display or an organic EL display. Display unit 43, for example, displays various pieces of information, such as information that is input from user I/F 42.

Apparatus I/F 44 is a circuit (a module) for connecting a different apparatus to control PC 4. Apparatus I/F 44 performs communication in compliance with a prescribed communication specification. Prescribed specifications include USB, HDMI (a registered trademark), IEEE 1394, Wi-Fi, Bluetooth (a registered trademark), and the like.

Network I/F 45 is a circuit (a module) for connecting control PC 4 to a network through a wireless or wired communication line. Network I/F 45 performs communication in compliance with a prescribed communication specification. Prescribed communication specifications include communication specifications, such as IEEE 802.3 and IEEE 802.11a/11b/11g/11ac.

As described above, control PC 4 performs calibration of the projection system (projector 1, mirror unit 3, and omnidirectional camera 2). That is, as illustrated in FIG. 2, control PC 4 includes calibration apparatus 46 that performs calibration of the projection system.

As illustrated in FIG. 4B, calibration apparatus 46 includes first calculation unit 47, second calculation unit 48, and calibration unit 49. First calculation unit 47 calculates distance L that is a length from projector 1 to mirror unit 3 along the optical path, based on the captured image of the projection image, which is an image of projection image 50 captured by omnidirectional camera 2. Second calculation unit 48 calculates height H that is a length from projector 1 to floor 71 along the vertical direction, based on the captured image of the projection image, which is an image of projection image 50 captured by omnidirectional camera 2. Calibration unit 49 performs calibration of projection image 50 based on distance L and height H that are calculated. First calculation unit 47, second calculation unit 48, and calibration unit 49 are realized by PC controller 40, storage 41, user interface 42, display unit 43, device interface 44, and network interface 45 that constitute control PC 4.

2. Operation

Operation by the projection system according to the present embodiment will be described below.

2-1. Outline of the Operation

Figure 5:
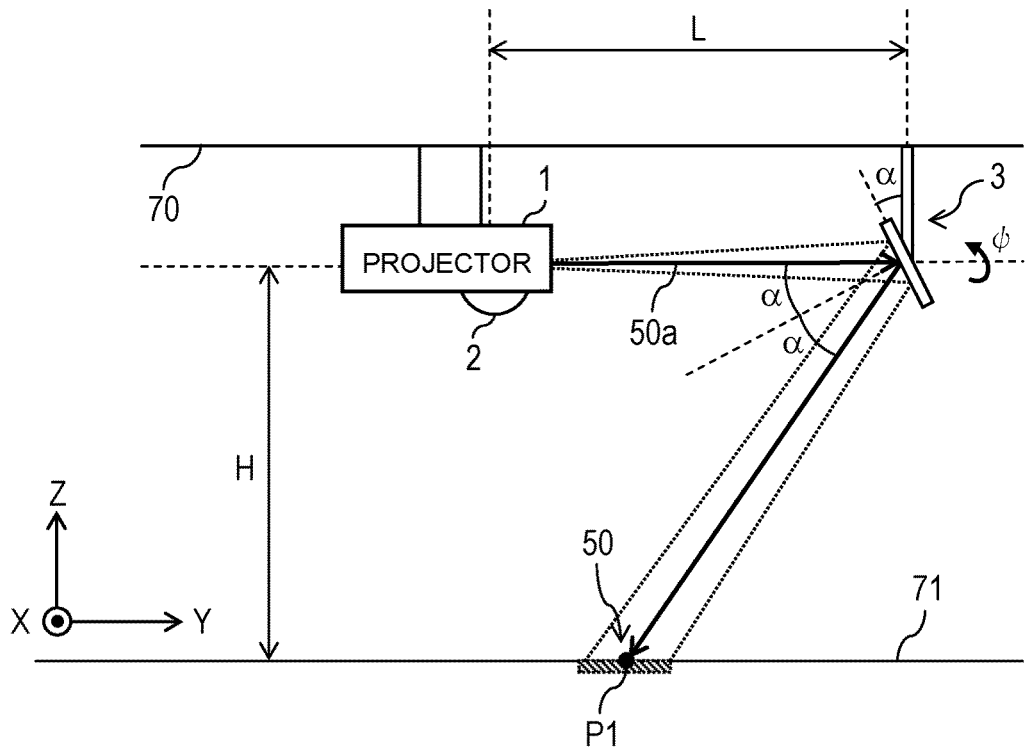
FIG. 5 is a diagram for describing an image projection operation by the projection system according to the first embodiment.

An outline of the operation by the projection system according to the present embodiment is described referring to FIG. 5.

FIG. 5 is a diagram for describing an image projection operation by the present system. In FIG. 5, projector 1 and mirror unit 3 are arranged to hang from ceiling 70. Projector 1 projects projection image 50 with floor 71 as the projection surface.

When the present system projects the image, omnidirectional camera 2 captures an image of floor 71 and transmits the captured image to control PC 4 (FIG. 1). Based on the captured image from omnidirectional camera 2, control PC 4 determines projection position P1 on floor 71 that is the projection surface, onto which projection image 50 is projected, a size of projection image 50, a projection direction of projection image 50, and the like. For example, control PC 4 determines a position of a specific photographic subject, such as person 6 (FIG. 1) in the captured image, and sets projection position P1 to be in the vicinity of the photographic subject.

Control PC 4 transmits the video signal to projector 1, and emits projection light 50*a* that generates projection image 50. Furthermore, control PC 4 controls pan angle ψ and tilt angle α of mirror unit 3 in such a manner that projection image 50 is projected onto projection position P1. Control PC 4 suitably performs control of optical zoom and a focus of projector 1 as well.

As described above, the present system projects projection image 50 onto desired projection position P1 or the like on floor 71 that is projection surface.

Control PC 4 performs various control operations using distance L between projector 1 and mirror unit 3, and height H from floor 71 to the optical axis of projector 1. That is, distance L and height H are parameters necessary for determining projection position P1 of projection image 50, a projection size, a focus, and the like, and there is a need to recognize distance L and height H before starting the image projection operation. At this point, distance L is a distance from projector 1 to mirror unit 3 along an optical path for projection light 50*a*. Furthermore, height H is a length from floor 71 that is the projection surface to projector 1 along the vertical direction.

At this point, normally, in order to know distance L and height H, there is a need for an operator to directly measure distance L and height H using a measuring tool or the like, and it takes a lot of labor for the operator to perform this job. At this time, there is a concern that the precision of the measurement that uses the measuring tool or the like will be low. Furthermore, it is also difficult for a person who has no specialized expertise to set a result of the measurement for control PC 4 of the present system or the like. Thus, in the calibration operation, the projection system according to the present embodiment automatically calculates distance L and height H without being equipped with a dedicated measurement sensor. Accordingly, distance L and height H can be specified saving the operator the labor of performing adjustment, and the calibration of the present system can be easy to perform. The calibration operation by the present system will be described below.

2-2. Calibration Operation

Figure 6:
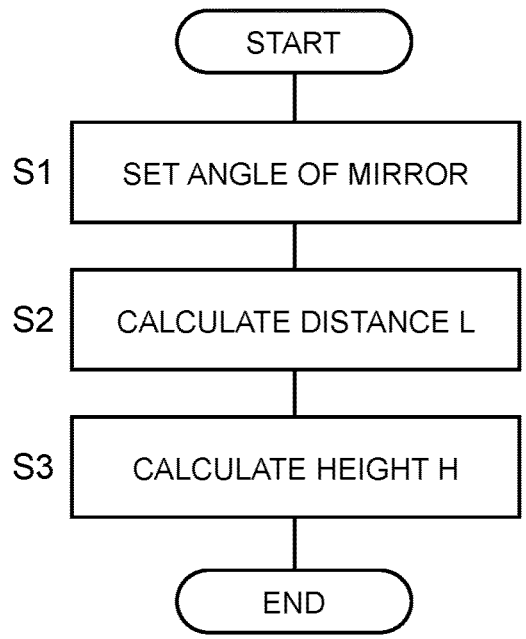
FIG. 6 is a flowchart illustrating a calibration operation by the projection system according to the first embodiment.
Figure 7:
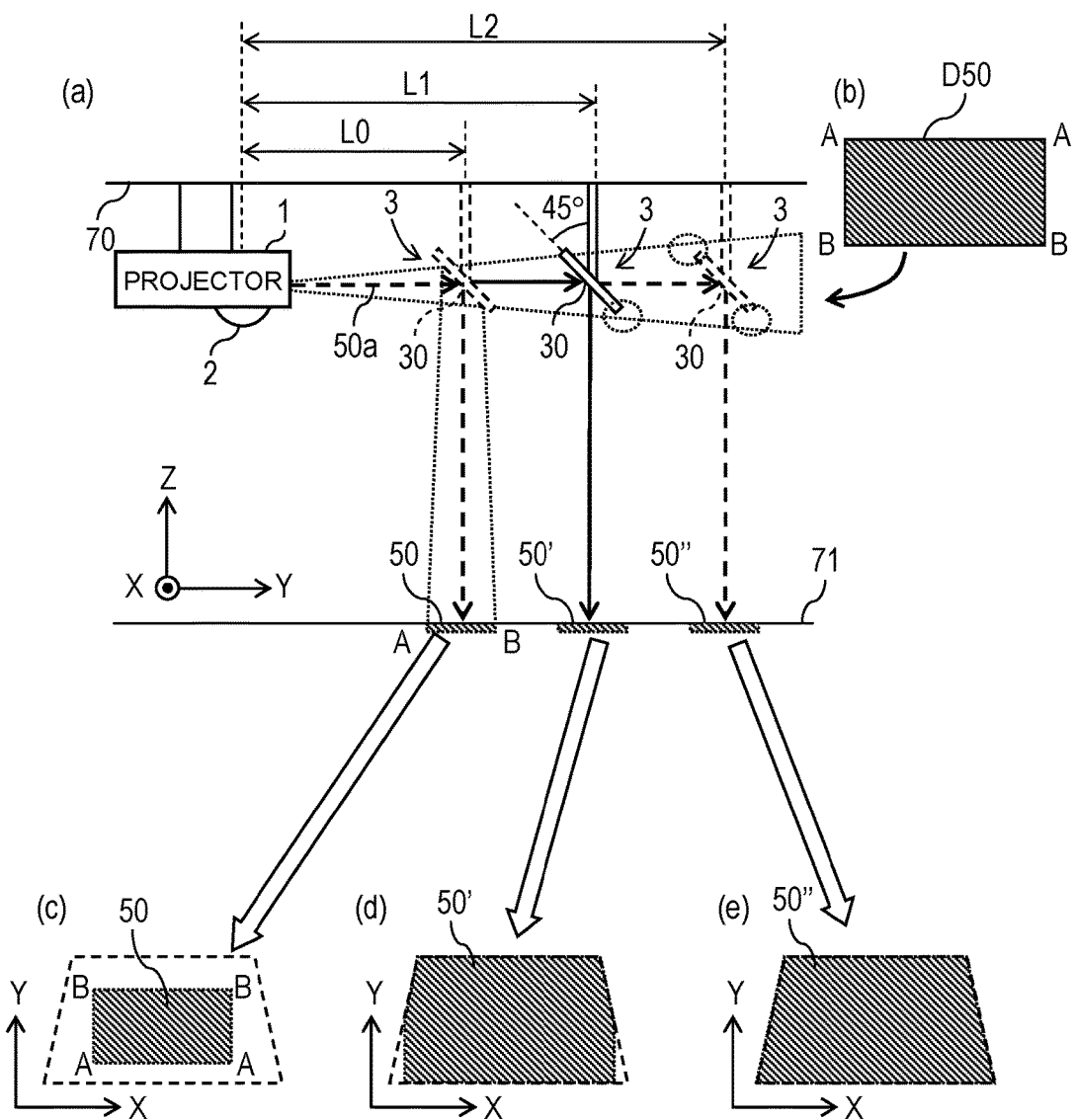
FIG. 7 shows diagrams for describing the calibration operation by the projection system according to the first embodiment.

The calibration operation by the projection system according to the present embodiment is described referring to FIG. 6 and (a) to (e) of FIG. 7. FIG. 6 is a flowchart illustrating the calibration operation by the present system. (a) to (e) of FIG. 7 are diagrams for describing the calibration operation by the present system.

The flowchart in FIG. 6 is executed by PC controller 40 of control PC 4. An example will be described in which processing according to the present flowchart is started in a state where projector 1 and mirror unit 3 are installed as is illustrated in FIG. 5.

First, control PC 4 sets an initial position for the calibration operation to be an angular position of mirror 30 in mirror unit 3 (S1). According to the present embodiment, an initial position of mirror 30 (refer to (a) of FIG. 7) is set to be at pan angle ψ=0° and tilt angle α=45°. Furthermore, according to the present embodiment, the angular position at which the horizontal direction of mirror 30 is in parallel with the X direction is set to be at pan angle ψ=0°, an angular position at which reflection surface 30*a* of mirror 30 is in parallel with the XZ plane is set to be at tilt angle α=0° (refer to FIG. 5). Processing in Step S1 will be described in detail below.

Next, control PC 4 controls projection image 50 that is projected onto floor 71 from projector 1 through mirror unit 3 in the initial position, and, based on an image of floor 71 that is captured by omnidirectional camera 2, each of distance L and height H are calculated (S2 and S3). An outline of a method of calculating distance L is described referring to (a) to (e) of FIG. 7.

(a) of FIG. 7 illustrates a state where projection light 50*a* is emitted to mirror units 3 that are installed at various distances L=L0, L1, L2 from projector 1. (b) of FIG. 7 illustrates measurement image D50 that is projected by projector 1. As is illustrated in (a) of FIG. 7, projection light 50*a* is emitted in the Y direction from projector 1, and, when reaching mirror unit 3 at tilt angle α=45°, is reflected in the Z direction and is projected on floor 71. On this occasion, upper end A and lower end B of measurement image D50 ((b) of FIG. 7) that results from projection light 50*a* that is emitted from projector 1 is reflected from mirror unit 3 and is projected onto floor 71 with the lower end and the upper lend being reversed in the Y direction ((c) of FIG. 7). The angular position of mirror 30 is set to be the initial position described above (pan angle ψ=0° and tilt angle α=45°), and thus distortion of measurement image D50 on floor 71 can be reduced.

Distance L0 in (a) of FIG. 7 is a distance over which projection light 50*a* from projector 1 is reflected entirely from mirror 30. With mirror unit 3 that is installed distance L0 away, as is illustrated in (c) of FIG. 7, measurement image D50 is projected without any leakage onto projection image 50 that is formed on floor 71, based on measurement image D50.

On the other hand, distance L1 (>L0) in (a) of FIG. 7 is a distance over which leakage of projection light 50*a* from projector 1 occurs from one end of mirror 30. At this time, projection light 50*a* that is emitted from projector 1 is more spread than in the case of distance L0, and projection light 50*a* that corresponds to lower end B of measurement image D50 protrudes from mirror 30. More precisely, with mirror unit 3 that is installed over distance L1, as is illustrated in (d)

of FIG. 7, projection image 50' on floor 71 takes the form of measurement image D50, one portion of whose upper end B is missing.

Furthermore, distance L2 (>L1) in (a) of FIG. 7 is a distance over which leakage of projection light 50a from projector 1 occurs from the vicinity of mirror 30. At this time, projection light 50a that is emitted from projector 1 is further more spread, and projection light 50a that corresponds to upper end A and lower end B of measurement image D50 protrudes from mirror 30. More precisely, with mirror unit 3 that is installed over distance L2, as is illustrated in (e) of FIG. 7, projection image 50" on floor 71 takes the form in accordance with the form of mirror 30 of mirror unit 3.

According to the present embodiment, with omnidirectional camera 2, image analysis is performed on captured images of projection images 50, 50' and 50" that, as described above, vary according to distance L, and thus distance L is calculated (S2). Processing in Step S2 will be described in detail below.

Figure 14:
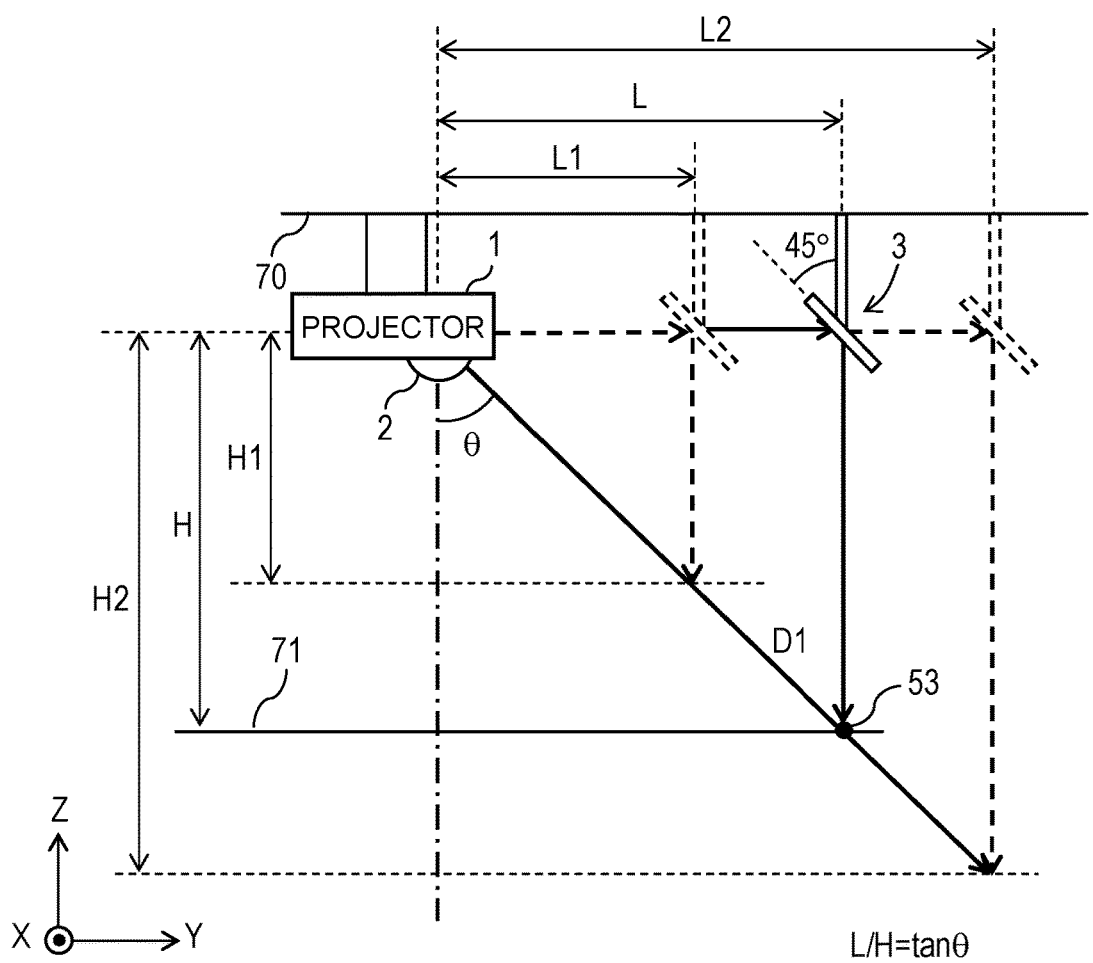
FIG. 14 is a diagram for describing a relationship between the distance and the height according to the first embodiment.

Furthermore, a position of projection image 50 in the captured image regularly changes based on a specific relationship between distance L and height H (refer to FIG. 14). According to the present embodiment, control PC 4 specifies the relationship described above, and this height H is calculated (S3). Processing in Step S3 will be described in detail below.

Control PC 4 stores calculated distance L and height H in storage 41 (FIG. 4A), and thus the processing is ended.

With the processing described above, distance L and height H can be calculated by performing the image analysis on projection image 50 that is captured by omnidirectional camera 2, and the calibration of the projection system is automatically performed. Furthermore, the processing described above can be performed based on the captured image by omnidirectional camera 2 that is used when the present system is normally used, and the calibration can be easy to perform without adding other software configurations. Processing in each of Steps S1, S2, and S3 will be described in detail below.

2-2-1. Processing that Sets an Angle of the Mirror (Step S1)

The projection system according to the present embodiment, in the initial state prior to the calibration, it is assumed that the angular positions, pan angle ψ and tilt angle α, of mirror 30 in mirror unit 3, cannot be determined. According to the present embodiment, in Step S1 in FIG. 6, based on the captured image that, when driving mirror unit 3, is captured by omnidirectional camera 2, pan angle ψ and tilt angle α are to be angular positions ψ=0° and α=45°, respectively.

Figure 8:
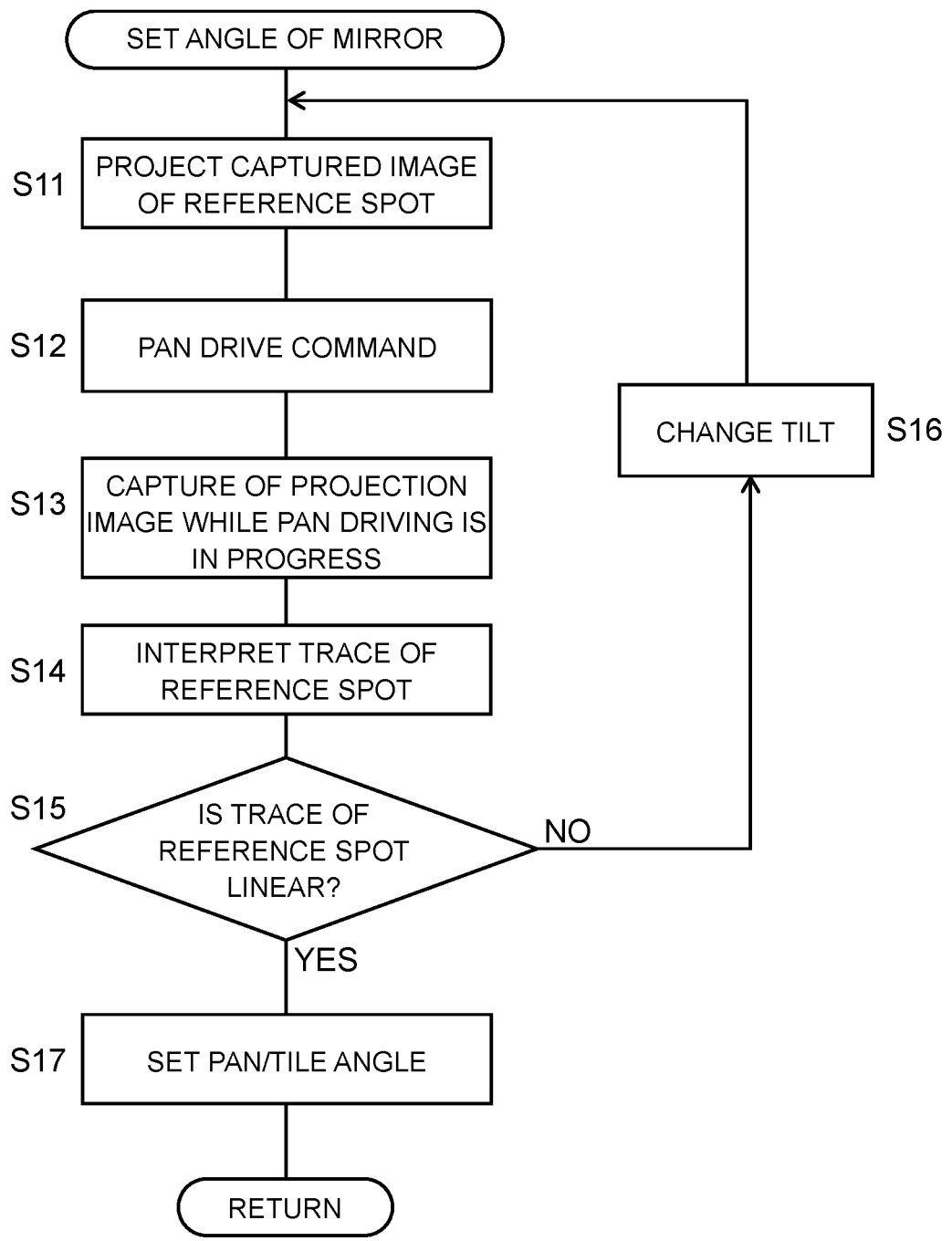
FIG. 8 is a flowchart for describing processing that sets an angle of a mirror according to the first embodiment.
Figure 9A:
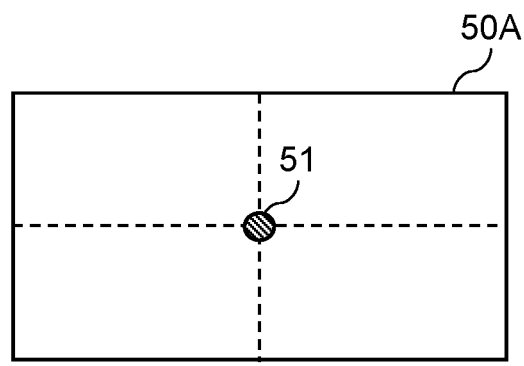
FIG. 9A is a diagram for describing a reference spot in a projection image from the projection system according to the first embodiment.
Figure 9B:
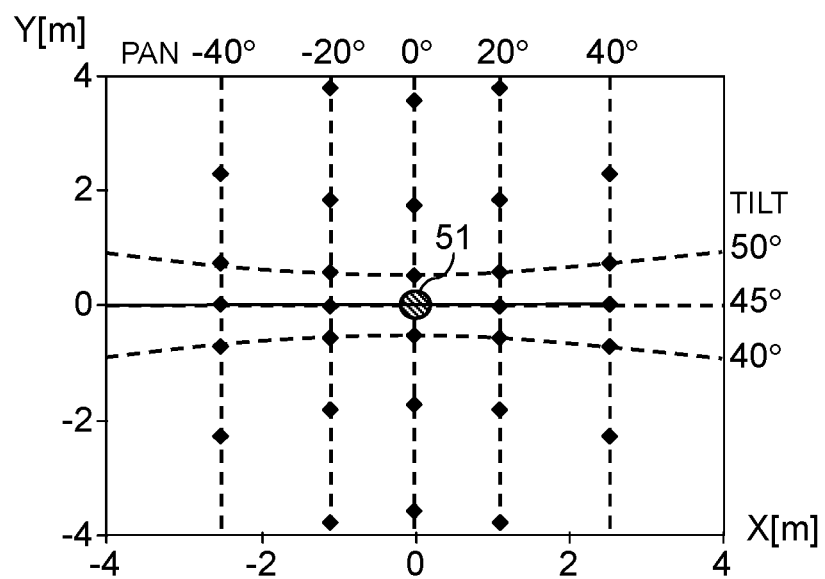
FIG. 9B is a diagram for describing a trace of the reference spot in a captured image from the projection system according to the first embodiment.

According to the present embodiment, a reference spot is projected onto floor 71 from projector 1, and the angle of mirror 30 is set based on a trace of the reference spot when driving mirror unit 3 for panning (refer to FIGS. 9A and 9B). Processing in Step S1 in FIG. 6 will be described below referring to FIG. 8 and FIGS. 9A and 9B. FIG. 8 is a flowchart for describing processing that sets the angle of mirror 30. FIG. 9A is a diagram for describing the reference spot in the projection image. FIG. 9B is a diagram for describing the trace of the reference spot in the captured image.

First, control PC 4 controls projector 1, and, for example, as illustrated in FIG. 9A, causes projection image 50A including reference spot 51 to be projected onto floor 71 (S11). Reference spot 51, as is illustrated in FIG. 9A, is one example of a reference mark indicating a center position of projection image 50A.

Next, control PC 4 transmits a drive command to drive pan drive unit 31 to mirror unit 3 (S12). Based on the drive command from control PC 4, pan drive unit 31, for example, rotatably drives mirror 30 in such a manner that pan angle ψ is gradually increased with a prescribed pitch, and transmits an amount of displacement of pan angle ψ to control PC 4 whenever necessary. At this time, tilt drive unit 32 is not moved, and tilt angle α is fixed.

Next, for a period of time when mirror unit 3 is driven in the pan direction, control PC 4 causes omnidirectional camera 2 to capture an image of floor 71 (refer to FIG. 5) and acquires the captured image from omnidirectional camera 2 (S13). Control PC 4 acquires the captured images in a plurality of frames by performing synchronization to the pan driving, and records the captured images that are acquired, in storage 41, in a state where each of the captured images is associated with the amount of displacement of pan angle ψ.

Next, control PC 4 analyzes a trace of reference spot 51 that is projected onto floor 71, in the captured images in the plurality of frames, which are acquired (S14). FIG. 9B illustrates a result of the analysis of the trace of reference spot 51. In FIG. 9B, the horizontal axis is along the X direction of floor 71, and the vertical axis is along the Y direction of floor 71.

As is illustrated in FIG. 9B, a position of reference spot 51 moves in such a manner that the position of reference spot 51 progresses in the X direction as pan angle ψ increases. Furthermore, the trace of reference spot 51 changes according to tilt angle α at the time of the pan driving. As is illustrated in FIG. 9B, as tilt angle α increases, the trace of reference spot 51 changes taking the following forms sequentially in the XY plane: a line that is convex-curved in the upward direction, a line that is in parallel with the X axis, a line that is convex-curved in the downward direction. In the trace in the form of a straight line, with respect to which the convex-curved line in the upward direction changes to the convex-curved line in the downward direction, tilt angle α can be specified as being angular position 45° that is the center of an angle range from 0° to 90°. Furthermore, as illustrated in FIG. 9B, the traces in the form of a curved line are symmetrical with respect to their respective curved-line apexes, and pan angle ψ at the curved line apex can be defined as angular position 0°. In Step S14, control PC 4 performs the image analysis on the captured image from omnidirectional camera 2, and thus, for example, a curvature of the trace of reference spot 51 is calculated, or the apex of the trace in the form of a curved line is specified.

Next, based on a result of the analysis of the captured image while the pan driving is in progress (FIG. 9B), control PC 4 determines whether or not the trace of reference spot 51 on floor 71 is linear (S15).

In a case where control PC 4 determines that the trace of reference spot 51 is not linear (No in S15), control PC 4 transmits a tilt drive command to mirror unit 3, and thus changes tilt angle α in such a manner that the trace of reference spot 51 approaches the form of a straight line (S16). For example, based on the curvature of the trace of reference spot 51, control PC 4 determines whether the curved line is convex in the upward direction or is convex in the downward direction. Control PC 4 increases tilt angle α, in a case where the curved line is convex in the upward direction, and decreases tilt angle α in a case where the curved line is convex in the downward direction. Control PC 4 repeats the processing operations in Step S11 and later, when it comes to post-change tilt angle α.

In a case where control PC 4 determines that the trace of reference spot 51 is linear (Yes in S15), as is described above, it is considered that tilt angle α is angular position 45°. Control PC 4 specifies tilt angle α that is formed when the trance of reference spot 51 determined as being linear is obtained, as angular position 45°, and sets specified angular position 45° to be an initial angle of the tilt angle (S17).

Furthermore, control PC 4 specifies pan angle ψ in accordance with the apex of the trace in the form of a straight line, as the angular position 0°, and sets specified angular position 0° to be an initial angle of the pan angle (S17). Accordingly, control PC 4 ends the processing in Step S1 in FIG. 6 and proceeds to Step S2.

When the processing described above is performed, based on the trace of reference spot 51 that is projected while mirror unit 3 is driven, a state where mirror unit 3 is at a prescribed angular position can be specified, and mirror 30 can be set to be at the prescribed angular position.

In the processing described above, each of pan angle ψ and tilt angle α specifies the angular position, but, for example, in a case where mirror unit 3 has a function of setting the angular position, pan angle ψ or tilt angle α, to be a specific angular position, any one of pan angle ψ and tilt angle α may be specified. Furthermore, in a case where mirror unit 3 has the function of setting the angular position, pan angle ψ or tilt angle α to be a specific angular position, the processing in each Steps S11 to S16 may be omitted, and pan angle ψ and tilt angle α may be directly set for the initial position.

2-2-2. Processing that Calculates Distance L (Step S2)

Figure 10:
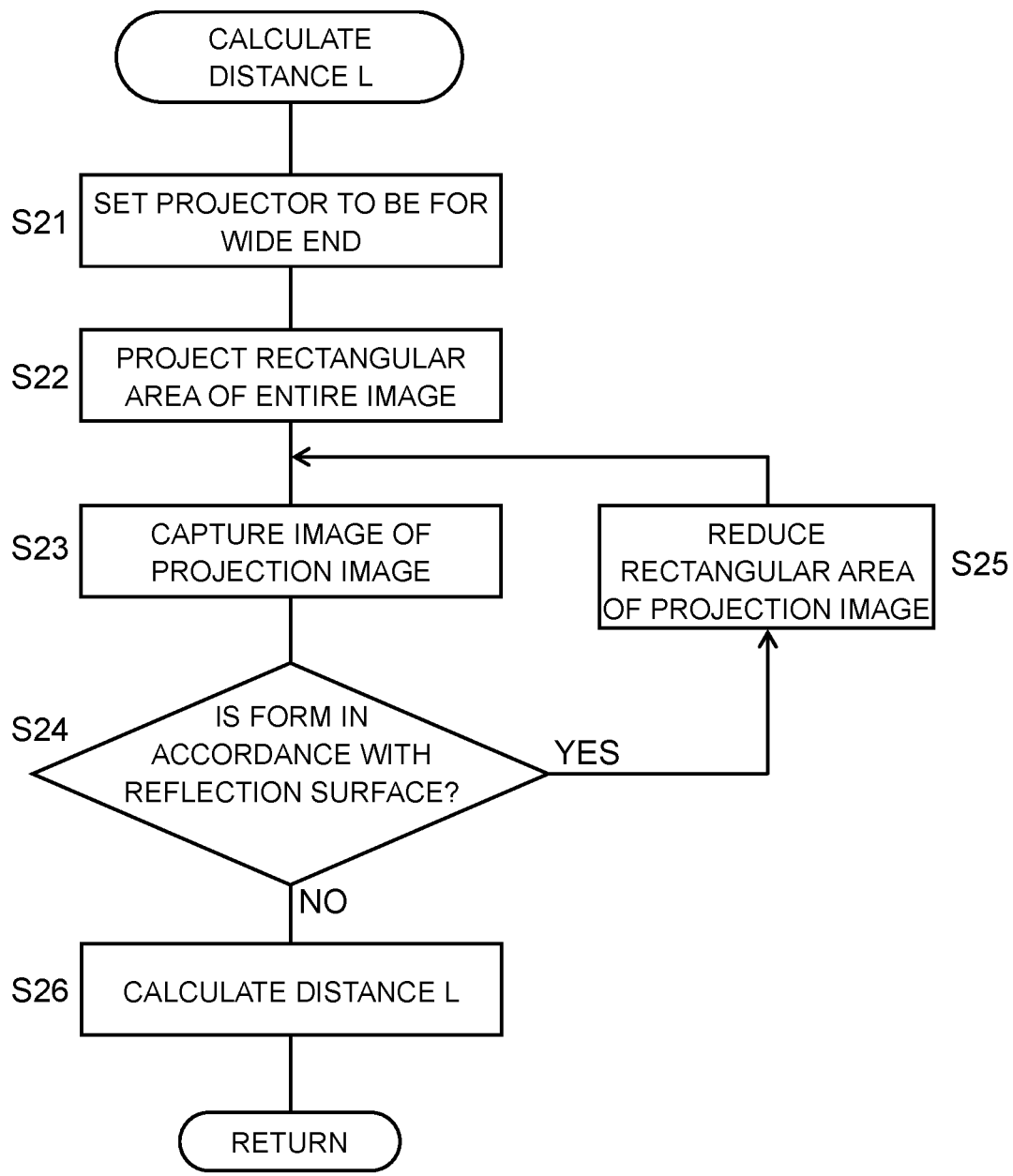
FIG. 10 is a flowchart for describing processing that calculates a distance from the projection system according to the first embodiment.
Figure 11:
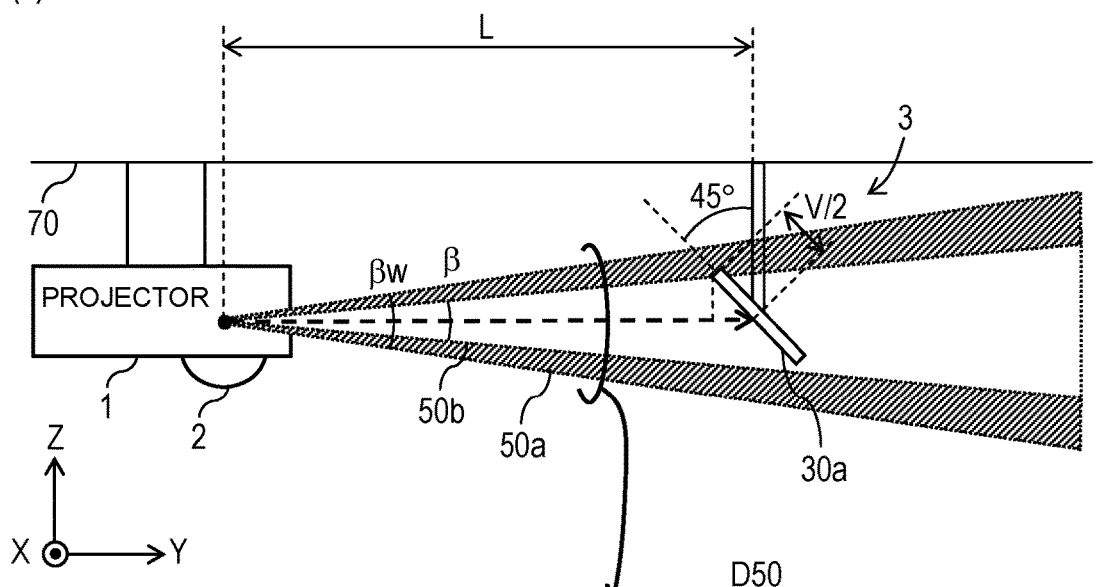
FIG. 11 shows diagrams for describing a method of calculating the distance from the projection system according to the first embodiment.
Figure 11:
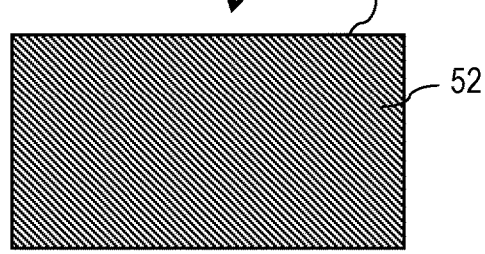
Figure 11:
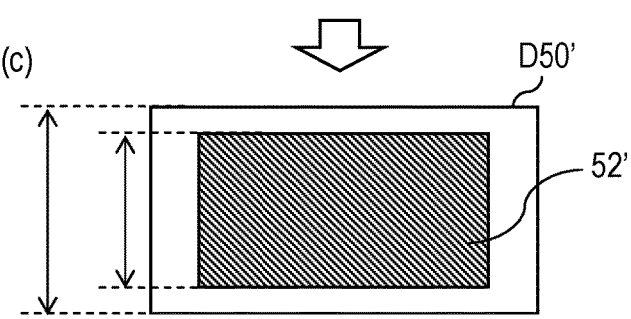

Processing that calculates distance L in FIG. 6 (Step S2) is described referring to FIG. 10 and (a) to (c) of FIG. 11. FIG. 10 is a flowchart for describing the processing that calculates distance L. FIG. 11 is a diagram for describing a method of calculating distance L.

As one example of Step S2, a method will be described below in which a size of projection image 50 that is based on measurement image D50 is controlled using the digital zoom, a change in the form of projection image 50 is determined, and distance L is calculated.

First, control PC 4 controls projection optical system 13 of projector 1 and thus performs the optical zoom. As is described in (a) of FIG. 11, control PC 4 sets the viewing angle of projector 1 to be viewing angle βw for a wide end (a wide angle end) (S21). A case will be described below where, as is illustrated in (a) of FIG. 11, in a state where the viewing angle of projector 1 is for the wide end, projection light 50*a* protrudes from the vicinity of reflection surface 30*a* of mirror unit 3 (refer to (e) of FIG. 7).

Next, control PC 4, as is illustrated in (b) of FIG. 11, causes the entire measurement image D50, rectangular area 52 that is displayed in white or the like, to be projected onto projector 1 (S22). When this is done, as illustrated in (e) of FIG. 7, the form of projection image 50″ that is formed on floor 71 becomes the form in which an upper portion and a lower portion of rectangular area 52 are missing in accordance with reflection surface 30*a* of mirror unit 3.

Next, control PC 4 causes omnidirectional camera 2 to capture an image of floor 71, and acquires a captured image of projection image 50″ on floor 71, from omnidirectional camera 2 (S23).

Next, control PC 4 performs the image analysis of the captured image from omnidirectional camera 2, which is acquired, and determines whether or not the form of projection image 50″ is the form in accordance with reflection surface 30*a* (S24).

In a case where it is determined that the form of projection image 50″ is the form in accordance with reflection surface 30*a* (Yes in S24), as illustrated in (b) and (c) of FIG. 11, control PC 4 performs the digital zoom that reduces rectangular area 52 within measurement image D50 (S25). The digital zoom is performed in such a manner that an aspect ratio of rectangular area 52 is maintained.

Control PC 4 repeats the processing operation Step S22 and later, based on measurement image D50′ of reduced rectangular area 52′. At this time, in a case where projection light 50*b* to a portion that corresponds to reduced rectangular area 52′ with respect to projection light 50*a* protrudes from the vicinity of reflection surface 30*a* in the same manner as before the reduction, projection image 50″ that has the same form and size is projected onto floor 71. On the other hand, when, with regard to the vicinity of reflection surface 30*a*, a portion of projection light 50*b* that corresponds to reduced rectangular area 52′, which does not protrude from the vicinity of reflection surface 30*a*, occurs, the projection image on floor 71 changes to the projection image in the form in which one portion of the upper end is missing, as is the case with the projection image 50′ in (d) of FIG. 7.

In a case where it is determined that the form of projection image 50′ that is based on measurement image D50′ is not the form in accordance with reflection surface 30*a* (No in S24), control PC 4 calculates distance L based on the size of reflection surface 30*a*, viewing angle βw, and a size of rectangular area 52′ (S26). For example, as is illustrated in (a) of FIG. 11, in a case where projection light 50*b* that corresponds to rectangular area 52′ does not protrude from an upper portion of reflection surface 30*a*, control PC 4 determines that the form of a lower portion of projection image 50′ in the captured image is not the form in accordance with reflection surface 30*a* (No in S24). In this case, control PC 4, for example, calculates distance L using the following equation.

$$L = 2^{-3/2} V(\cot(\beta/2) + 1) \quad (1)$$

in the above equation (1), β is an effective viewing angle that corresponds to rectangular area 52′, V is a size in the vertical direction, of reflection surface 30*a*, and $\cot(\beta/2) = 1/\tan(\beta/2)$. With a length of the optical path for projection light 50*a* within projector 1, or the like, control PC 4 may suitably make a revision to the equation described above.

Control PC 4 calculates distance L in Step S26, and thus ends the processing in Step S2 in FIG. 6 and proceeds to Step S3.

When the processing described above is performed, distance L can be calculated based on the form of projection image 50 that changes according to distance L from projector 1 to mirror unit 3, which is a length along the optical path for projection light 50*a*, and on the size of reflection surface 30*a*.

The example is described above in which distance L is calculated based on the form of projection image 50′ in the case where projection light 50*b* does not protrude from the upper portion (the Z direction) of reflection surface 30*a*. Also in a case where projection light 50*b* does not protrude from the lower portion (the Z direction) of reflection surface 30*a*, distance L can be calculated in the same manner using a prescribed equation.

Furthermore, the case is described above in which projection light 50*a* protrudes from the vicinity of reflection surface 30*a* of mirror unit 3 in Step S21. However, also in a case where projection light 50*a* protrudes from one portion of reflection surface 30*a* of mirror unit 3, the change of the form from projection image 50" to projection image 50' can be suitably determined and an equation that corresponds to the changed portion can be used, thereby calculating distance L.

Furthermore, the size of rectangular area 52 is described above as being changed using the digital zoom, but in addition to this, or instead of this, the optical zoom may be used.

Furthermore, control PC 4 is described above as changing the size of rectangular area 52 and thus determining the change in the form of projection image 50" to calculate distance L. Control PC 4 may calculate distance L based on the form of projection image 50" without changing the size of rectangular area 52. For example, control PC 4 may perform the image analysis on the captured image of projection image 50" which is based on measurement image D50 that is displayed in state of being crosshatched throughout for the wide end, and thus may extract a portion of projection image 50" that is missing in accordance with the form of reflection surface 30a and may calculate distance L based on the form of the extracted portion.

2-2-3. Processing that Calculates Height H (Step S3)

Figure 12:
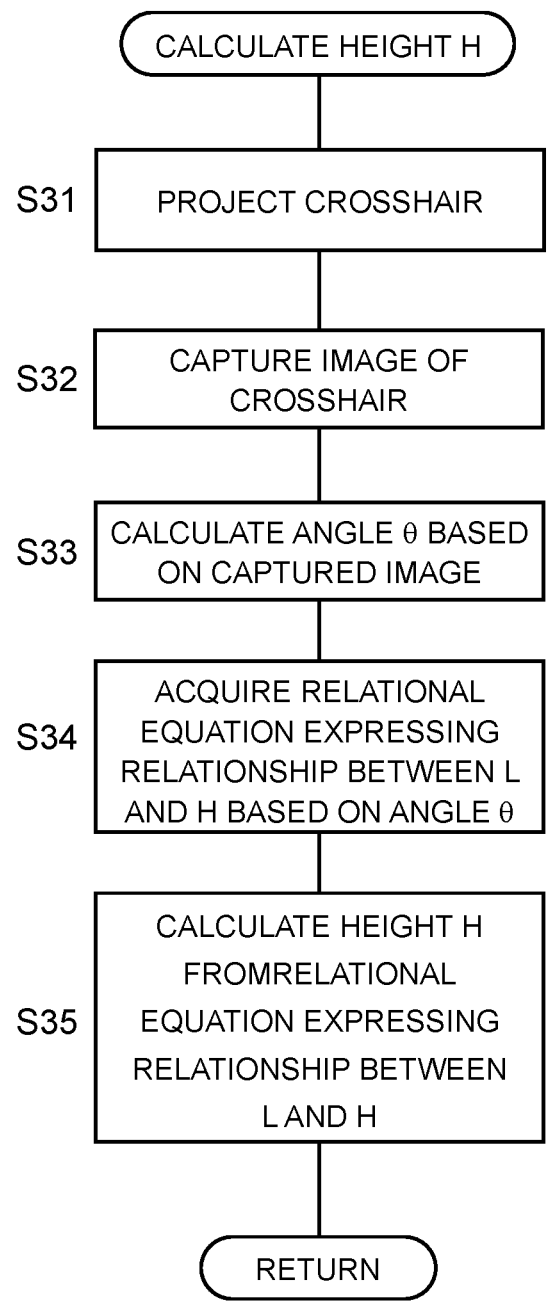
FIG. 12 is a flowchart for describing processing that calculates a height to the projection system according to the first embodiment.
Figure 13A:
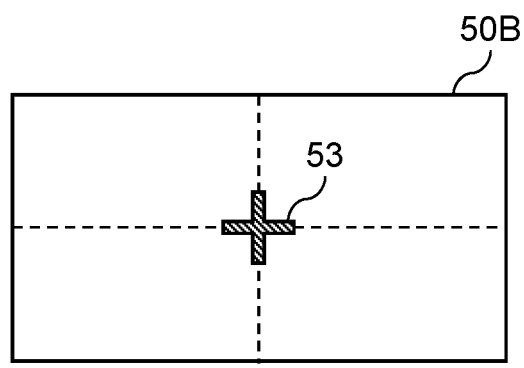
FIG. 13A is a diagram for describing a reference mark for calculating the height to the projection system according to the first embodiment.
Figure 13B:
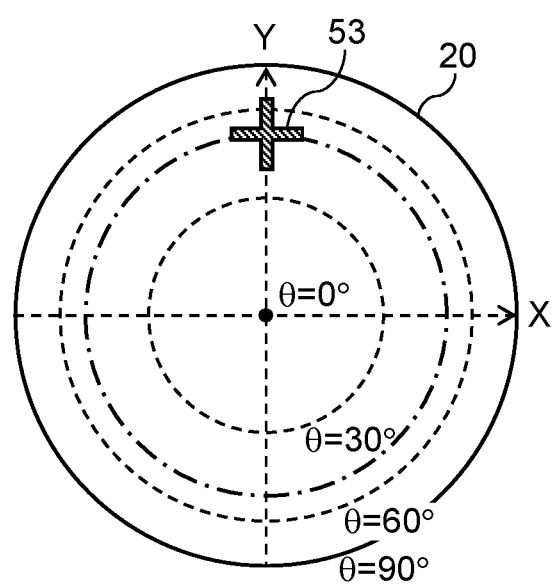
FIG. 13B is a diagram for describing a captured image of the reference mark for calculating the height to the projection system according to the first embodiment.

Processing that calculates height H in FIG. 6 (Step S3) is described referring to FIGS. 12, 13A, 13B, and 14. FIG. 12 is a flowchart for describing the processing that calculates height H. FIG. 13A is a diagram for describing the reference mark for calculating height H. FIG. 13B is a diagram for describing a captured image of the reference mark for calculating height H. FIG. 14 is a diagram for describing a relationship between distance L and height H.

First, control PC 4, for example, causes projection image 50B, which includes crosshair 53 as is illustrated in FIG. 13A, to be projected onto projector 1 (S31). Crosshair 53, as illustrated in FIG. 13A, indicates a center position in projection image 50B. Crosshair 53 is one example of the reference mark. Instead of the crosshair, various marks may be used, and reference spot 51 in FIG. 9A may be used.

Next, control PC 4 causes omnidirectional camera 2 to capture an image of floor 71 on which crosshair 53 is projected, and acquires captured image 20 from omnidirectional camera 2 (S32). FIG. 13B illustrates one example of captured image 20 that is acquired in Step S32.

Next, based on captured image 20 that is acquired, as is illustrated in FIG. 14, control PC 4 calculates angle θ that is made between direction D1 (a first direction) from omnidirectional camera 2 to a projection position of crosshair 53 and the Z direction (a second direction) (S33).

In Step S33, according to the present embodiment, captured image 20 is used that constitutes an omnidirectional-fashion image. As is illustrated in FIG. 13B, in captured image 20, a specific angular position corresponds to a position on a circular line that is concentric with the center position, and for example, if crosshair 53 is at the center position, angle θ=0°. Control PC 4 calculates angle θ based on a position of crosshair 53 in which the center position serves as a reference in captured image 20.

Next, control PC 4 acquires a relational equation expressing a relationship between distance L and height H, which is based on calculated angle θ (S34). As is illustrated in FIG. 14, distance L and height H satisfy the following relational equation based on angle θ.

$$L/H = \tan\theta \quad (2)$$

According to Relational Equation (2), as is illustrated in FIG. 14, various candidates for a combination of distance L and height H that satisfies Equation (2) which is based on angle θ are considered such as (L1, H1), (L2, H2), and the like. When a value of any one of distance L and height H is specified, a value of the other can be calculated based on Relational Equation (2).

Next, control PC 4 substitutes distance L, which is calculated in Step S2 in FIG. 6, into Relational Equation (2) that is acquired, and thus calculates height H (S35) and ends the processing in Step S3 in FIG. 6.

When the processing described above is performed, angle θ is calculated, and thus one independent condition (Equation (2)) can be obtained for two variables, distance L and height H. Two independent conditions can be obtained in conjunction with the result of the calculation in Step S2, and thus distance L and height H can be calculated.

Relational Equation (2) expressing the relationship between distance L and height H is described as being acquired after Step S2 in FIG. 6, but Relational Equation (2) expressing the relationship between distance L and height H may be acquired before Step S2. In this case, the processing in each of Steps S31 to S34 in FIG. 12 is performed earlier than that in Step S2 in FIG. 6, and the calculation of height H (S35) is performed after Step S2.

As is described above, with the calibration operation of the projection system according to the present embodiment, distance L and height H can be obtained.

3. Effect and Others

As described above, the projection system according to the present embodiment includes projector 1, mirror unit 3, omnidirectional camera 2, and control PC 4. Projector 1 emits projection light 50a for displaying measurement image D50. Mirror unit 3 changes the optical path for projection light 50a from projector 1 and guides projection light 50a toward floor 71. Omnidirectional camera 2 captures projection image 50 that is projected onto floor 71 from mirror unit 3, based on measurement image D50. Control PC 4 controls projection image 50. Control PC 4 calculates distance L (a first distance), which is a length from projector 1 to mirror unit 3 along the optical path, and height H (a second distance), which is a length from projector 1 to floor 71 along the vertical direction, based on the captured image of projection image 50 by omnidirectional camera 2, and controls projection image 50 based on calculated distance L and height H.

With the projection system described above, distance L and height H can be calculated by control PC 4 based on the captured image of projection image 50 by omnidirectional camera 2, and the calibration of the projection system can be easy to perform. Furthermore, in the present system that goes through the calibration, projection image 50 can be suitably controlled.

Furthermore, according to the present embodiment, control PC 4 is calibration apparatus 46 that performs the calibration of the projection system (projector 1, mirror unit 3, and omnidirectional camera 2) which projects projection image 50.

Furthermore, according to the present embodiment, mirror unit 3 includes reflection surface 30a from which projection light 50a is reflected. Control PC 4 calculates distance L and height H based on the captured image of projection image 50 that is projected in a case where tilt angle α of reflection surface 30a is a prescribed initial position (α=45°) (S1). Control PC 4 can easily perform the calibration based on the captured image of projection image 50 with respect to reflection surface 30a at an initial position.

Figure 15:
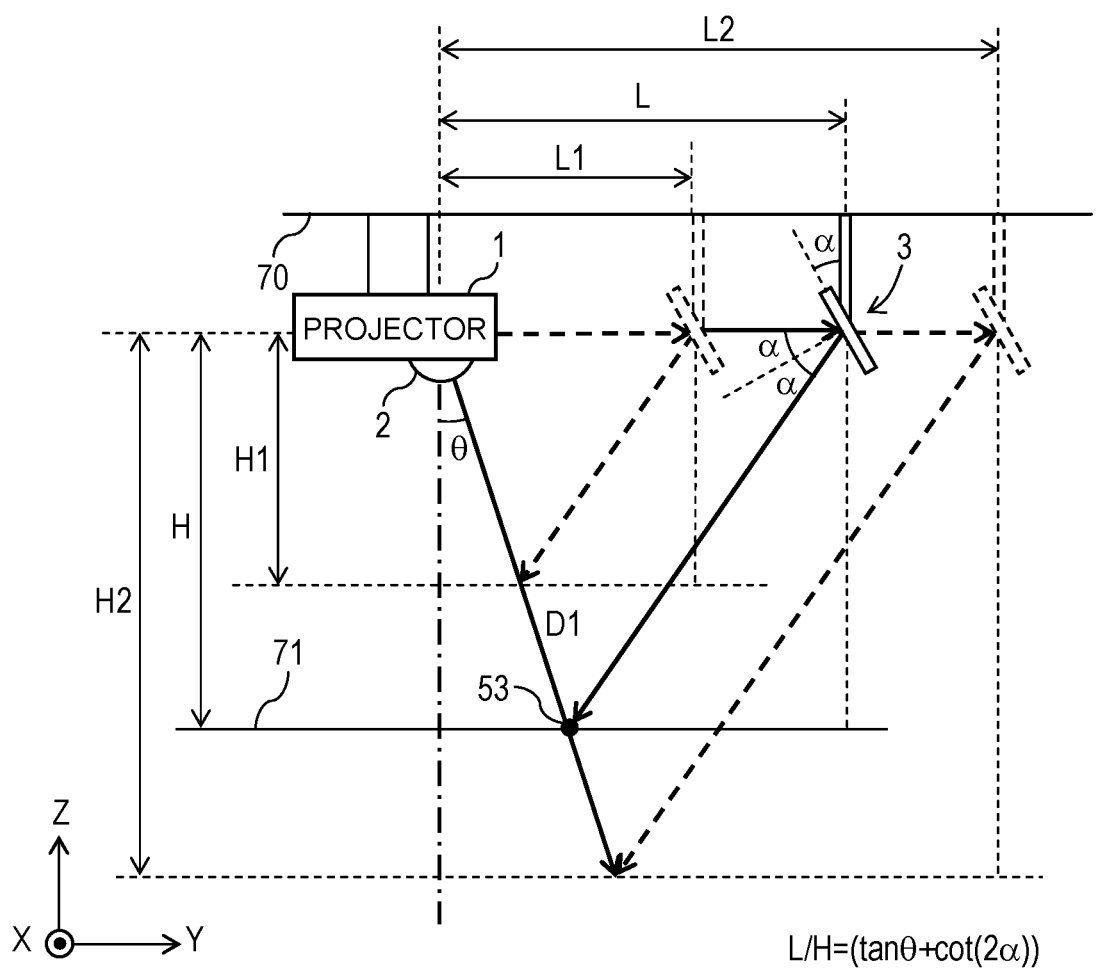
FIG. 15 is a diagram for describing a modification example of the relationship between the distance and the height according to the first embodiment.

Moreover, the initial angle of tilt angle α may not be 45°. The calibration operation that is based on arbitrary tilt angle α (0°<α<90°) will be described referring to FIG. 15. FIG. 15 is a diagram for describing a modification example a relationship between distance L and height H.

As is illustrated in FIG. 15, at arbitrary tilt angle α (0°<α<90°), distance L and height H satisfies the following relationship equation.

$$L/H=(\tan\theta+\cot(2\alpha)) \quad (3)$$

For this reason, in Step S3 in FIG. 6, instead of Equation (2), Equation (3) can be used for tilt angle α for various initial positions, and thus the relational equation expressing the relation between distance L and height H can be obtained. Furthermore, also in Steps S1 and S2, the initial angle of tilt angle α can be changed.

Furthermore, according to the present embodiment, omnidirectional camera 2 captures projection image 50 that is formed on floor 71 by projection light 50a which is reflected from reflection surface 30a. Control PC 4 calculates distance L based on at least one of the form and the size of each of projection images 50, 50' and 50" in the captured image by omnidirectional camera 2, and the size of reflection surface 30a (S2). Accordingly, control PC 4 can calculate distance L without employing a configuration in which a hardware item other than omnidirectional camera 2 is added.

Furthermore, according to the present embodiment, projector 1 projects projection image 50A including reference spot 51 on floor 71 (S11). Omnidirectional camera 2 captures projection image 50A including reference spot 51 that is projected onto floor 71. Control PC 4 controls mirror unit 3 and thus causes reference spot 51 to move on floor 71 (S12). Control PC 4 specifies tilt angle α and pan angle ψ of reflection surface 30a based on the trace (FIG. 9B) of reference spot 51 in the captured image of the projection image 50A including reference spot 51, which is captured by omnidirectional camera 2 (S15 and S17). Accordingly, also in a case where tilt angle α and pan angle ψ are not determined in the initial state, control PC 4 can easily perform the calibration. Moreover, no limitation to reference spot 51 is imposed, and various reference marks may be used.

Furthermore, according to the present embodiment, projector 1 projects projection image 50B including crosshair 53, onto floor 71 (S31). Omnidirectional camera 2 captures projection image 50B including crosshair 53 that is projected on floor 71 (S32). Control PC 4 calculates angle θ that is made between direction D1 (the first direction) from omnidirectional camera 2 to a position at which projection image 50B is projected and the Z direction (the second direction) that specifies height H, based on captured image 20 that is the captured image of projection image 50B including crosshair 53, which is captured by omnidirectional camera 2 (S33). Control PC 4 calculates height H based on calculated angle θ and distance L (S35). Accordingly, height H can be easily specified based on calculated angle θ and distance L.

Furthermore, according to the present embodiment, omnidirectional camera 2 captures a prescribed photographic subject, such as person 6. Control PC 4 controls projection image 5 based on the captured image of the photographic object by omnidirectional camera 2. Accordingly, the calibration can be performed without employing a configuration in which another hardware item is added, using omnidirectional camera 2 for capturing the photographic subject at the time of normal use.

Furthermore, according to the present embodiment, the optical path for projection light 50a that is emitted from projector 1 is horizontal.

Other Embodiments

As described above, an example of the technology that is disclosed in the present application, the first embodiment is described. However, the technology in the present disclosure is not limited to the present disclosure, and possibly applies also to an embodiment that results from suitably performing change, substitution, addition, omission, and the like. Furthermore, it is also possible that a new embodiment is created as a result of combining the constituent elements that are described according to each of the embodiments. Thus, other embodiments are described as examples.

According to the embodiment described above, with the processing in each of Steps S2 and S3 in FIG. 6, distance L and height H are calculated. Instead of any one of Steps S2 and S3, a projection system in the present disclosure may calculate a total distance (L+H), for example, based on a focal distance of the projection image that is projected onto the projection surface such as floor 71. In this case, for example, projector 1 includes a position sensor that is to be installed in a lens position in projection optical system 13, and thus can measure the focal distance.

Furthermore, according to the embodiment, projector 1 and mirror unit 3 are installed in such a manner as to hang from ceiling 70 and the like, but, for example, may be fixed to a wall or the like or may be placed on a bed, a desk, or the like for use. In this case, the first distance is a distance between projector 1 and the mirror unit that are installed, as is the case with distance L. Furthermore, the second distance is a distance from the projection surface that is suitably set depending on various installation places, to projector 1, instead of height H.

Furthermore, according to the embodiment, one example of the capture unit in the projection system, omnidirectional camera 2 is described above. A capture unit in the present disclosure is not limited to omnidirectional camera 2, and instead, a camera may be used that has a viewing angle of less than 180°. In this case, for example, in S33 in FIG. 12, control PC 4 calculates angle θ from a normal plane image, not the omnidirectional-fashion image. Furthermore, the capture unit may be a RGB camera, and may be an infrared camera.

Furthermore, according to the embodiment, as one example of the optical path change unit in the projection system, mirror unit 3 is described above, but the optical path change unit is not limited to mirror unit 3. For example, the optical path change unit may be configured using various optical systems, such as a prism, without using mirror 30.

Furthermore, a rotation axis of mirror unit 3 is not limited to J1 and J2 (FIG. 3). For example, instead of rotation axis J1, the Z direction may be set to be the rotation axis, and the vertical direction of reflection surface 30a may be set to be the rotation axis. In this case, a trace that corresponds to a prescribed angular position can be suitably set in advance, and thus the same processing as in the flowchart in FIG. 8 can be performed.

Furthermore, instead of control PC 4 according to the embodiment described above, various information processing apparatuses may be used. Furthermore, according to the embodiments, control PC 4 and projector 1 are described above as being separated, but a controller and calibration apparatus 46 in the present disclosure may be configured to be integrally combined with a projection unit.

As an example of the technology in the present disclosure, the embodiments are described above. For that reason, the accompanying drawings and the detailed description are provided.

Therefore, among the constituent elements that are described in detail referring to the accompanying drawings, the constituent elements that are not indispensable for solving the problem, as well as the constituent elements that are indispensable for solving the problem, can be included in order to describe the technology. For this reason, although the constituent elements not indispensable are described in detail referring to the accompanying drawing, directly, this does not have to be construed to admit that the constituent elements not indispensable are the indispensable elements.

Furthermore, because the embodiments described above are for describing the technology in the present disclosure, various changes, substitutions, addition, omission, and the like can be performed within the scope of claims or the scope of equivalents of claim elements.

It is possible that the projection system in the present disclosure finds widespread application in projection an image onto a projection surface.

What is claimed is:

1. A projection system comprising:
   a projection unit that emits projection light for displaying a prescribed image;
   an optical path change unit that changes an optical path for the projection light from the projection unit and guides the projection light toward a prescribed projection surface;
   a capture unit that captures a projection image that is projected onto the projection surface from the optical path change unit, based on the prescribed image; and
   a controller that controls the projection image,
   wherein the controller calculates a first distance that is a length from the projection unit to the optical path change unit along the optical path and a second distance that is a length from the projection unit to the projection surface along a vertical direction, based on the captured image by the capture unit, and controls the projection image based on the first distance and the second distance that are calculated.

2. The projection system of claim 1,
   wherein the optical path change unit includes a reflection surface from which the projection light is reflected, and
   wherein the controller calculates the first distance and the second distance based on an inclination angle of the reflection surface and on the captured image.

3. The projection system of claim 2,
   wherein the capture unit captures the projection image that is formed on the projection surface by the projection light which is reflected from the reflection surface, and
   wherein the controller calculates the first distance based on at least one of a form and a size of the projection image in the captured image by the capture unit and on a size of the reflection surface.

4. The projection system of claim 2,
   wherein the projection unit projects an image including a reference mark onto the projection surface,
   wherein the capture unit captures a projection image including the reference mark that is projected on the projection surface, and
   wherein the controller controls the optical path change unit and thus causes the reference mark to move on the projection surface, and specifies an inclination angel of the reflection surface based on a trace of the reference mark in the captured image of the projection image including the reference mark, which is captured by the capture unit.

5. The projection system of claim 1,
   wherein the projection unit projects an image including a reference mark onto the projection surface,
   wherein the capture unit captures a projection image including the reference mark that is projected on the projection surface, and
   wherein the controller calculates an angle that is made between a first direction from the capture unit to a position onto which the reference mark is projected, and a second direction that specifies the second distance, based on the captured image of the projection image including the reference mark, which is captured by the capture unit, and calculates the second distance based on the angle and the first distance.

6. The projection system of claim 1,
   wherein the capture unit captures a prescribed photographic subject, and
   wherein the controller controls the projection image based on the captured image by the capture unit.

7. The projection system of claim 1,
   wherein the capture unit is configured with an omnidirectional camera.

8. The projection system of claim 1,
   wherein the optical path is horizontal.

9. A calibration apparatus that performs calibration of a projection system,
   wherein the projection system includes
      a projection unit that emits projection light for displaying a prescribed image,
      an optical path change unit that changes an optical path for the projection light from the projection unit and guides the projection light toward a prescribed projection surface, and
      a capture unit that captures a projection image that is projected onto the projection surface from the optical path change unit, based on the prescribed image,
   the calibration apparatus comprising:
   a first calculation unit that calculates a first distance that is a length from the projection unit to the optical path change unit along the optical path based on the captured image by the capture unit;
   a second calculation unit that calculates a second distance that is a length from the projection unit to the projection surface along a vertical direction based on the captured image by the capture unit; and
   a calibration unit that performs calibration of the projection image based on the first distance and the second distance that are calculated.

* * * * *